United States Patent
Choi et al.

(10) Patent No.: US 9,538,566 B2
(45) Date of Patent: Jan. 3, 2017

(54) METHOD AND DEVICE FOR TRANSMITTING RECEPTION ACKNOWLEDGEMENT RESPONSE IN WIRELESS COMMUNICATION SYSTEM

(71) Applicant: LG ELECTRONICS INC., Seoul (KR)

(72) Inventors: Hyeyoung Choi, Anyang-si (KR); Hyunwoo Lee, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 206 days.

(21) Appl. No.: 14/378,582

(22) PCT Filed: Feb. 20, 2013

(86) PCT No.: PCT/KR2013/001325
§ 371 (c)(1),
(2) Date: Aug. 13, 2014

(87) PCT Pub. No.: WO2013/125842
PCT Pub. Date: Aug. 29, 2013

(65) Prior Publication Data
US 2015/0009932 A1 Jan. 8, 2015

Related U.S. Application Data

(60) Provisional application No. 61/601,031, filed on Feb. 21, 2012.

(51) Int. Cl.
*H04W 4/00* (2009.01)
*H04W 76/02* (2009.01)
(Continued)

(52) U.S. Cl.
CPC ............. *H04W 76/023* (2013.01); *H04L 1/16* (2013.01); *H04L 1/1854* (2013.01);
(Continued)

(58) Field of Classification Search
CPC .. H04W 4/005; H04W 72/0446; H04W 74/02; H04W 74/006; H04W 76/023; H04L 1/06; H04L 1/1664; H04L 1/1896; H04L 1/1861; H04L 1/16
(Continued)

(56) References Cited

U.S. PATENT DOCUMENTS

2007/0230337 A1 10/2007 Igarashi et al.
2009/0046650 A1 2/2009 Dalsgaard et al.
(Continued)

FOREIGN PATENT DOCUMENTS

WO 2012011786 A2 1/2012

OTHER PUBLICATIONS

Institute for Information Industry (III), "Discussion on the necessity of HARQ for low cost MTC LTE UE", R1-120669, 3GPP TSG RAN WG1 Meeting #68, Dresden, Germany, Feb. 6-10, 2012, see pp. 1-2.

*Primary Examiner* — Thai Hoang
(74) *Attorney, Agent, or Firm* — Dentons US LLP

(57) ABSTRACT

According to one embodiment of the present invention, a method for transmitting a reception acknowledgement response by an user equipment for performing device-to-device communication in a wireless communication system, comprises the steps of: receiving a physical downlink shared channel; and transmitting a reception acknowledgement response for the physical downlink shared channel on a resource for a physical uplink control channel, wherein the reception acknowledgement response is transmitted according to a setting of a round trip time (RTT), and the RTT is set for each user equipment.

19 Claims, 12 Drawing Sheets

(51) Int. Cl.

| | |
|---|---|
| *H04L 1/16* | (2006.01) |
| *H04W 72/04* | (2009.01) |
| *H04W 74/00* | (2009.01) |
| *H04W 74/02* | (2009.01) |
| *H04L 1/18* | (2006.01) |
| *H04L 1/06* | (2006.01) |

(52) U.S. Cl.
CPC ........... *H04L 1/1861* (2013.01); *H04W 4/005* (2013.01); *H04W 72/0446* (2013.01); *H04W 74/006* (2013.01); *H04W 74/02* (2013.01); *H04L 1/06* (2013.01); *H04L 1/1664* (2013.01); *H04L 1/1896* (2013.01)

(58) Field of Classification Search
USPC .................................................. 370/329–348
See application file for complete search history.

(56) References Cited

U.S. PATENT DOCUMENTS

| | | | |
|---|---|---|---|
| 2010/0254287 A1 | 10/2010 | Sawahashi et al. | |
| 2011/0141901 A1* | 6/2011 | Luo ....................... | H04L 1/1822 370/241 |
| 2011/0255450 A1* | 10/2011 | Wang ................ | H04W 72/0493 370/280 |
| 2013/0010720 A1* | 1/2013 | Lohr ..................... | H04L 1/0026 370/329 |
| 2014/0204922 A1* | 7/2014 | Kim ........................ | H04J 3/12 370/336 |
| 2014/0321402 A1* | 10/2014 | Wang ................... | H04W 72/04 370/329 |

\* cited by examiner

METHOD AND DEVICE FOR TRANSMITTING RECEPTION ACKNOWLEDGEMENT RESPONSE IN WIRELESS COMMUNICATION SYSTEM

This application is a National Stage Application of International Patent Application No. PCT/KR2013/001325, filed on Feb. 20, 2013, and claims the benefit of U.S. Provisional Application No. 61/601,031, filed on Feb. 21, 2012 in the United States Patent and Trademark Office, all of which are incorporated herein by reference in their entirety.

TECHNICAL FIELD

The following explanation relates to a method of transmitting a reception confirmation response in a wireless communication system and an apparatus therefor.

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

A device-to-device (D2D) communication indicates a communication scheme directly transceiving audio, data and the like between user equipments without passing through an evolved Node B (eNB) in a manner of configuring a direct link between the user equipments (UEs). The D2D communication may include such a communication scheme as a UE-to-UE communication, a peer-to-peer communication and the like. And, the D2D communication can be applied to an M2M (machine-to-machine) communication, an MTC (machine type communication) and the like.

The D2D communication is considered as a solution capable of solving the burden of an eNode B resulted from rapidly increasing data traffic. For instance, unlike a legacy wireless communication system, since the D2D communication transceives data between devices without passing through the eNode B, overload of a network can be reduced. If the D2D communication is introduced, it may expect such an effect as reduction of procedures of the eNode B, reduction of power consumption of devices participating in the D2D, increase of data transmission speed, increase of network capability, load distribution, expansion of cell coverage and the like.

The D2D communication can be classified according to a coordination station. The coordination station may correspond to an eNode B, a network, a user equipment or the like. A D2D UE can receive information necessary for transmitting and receiving data from the coordination station.

DISCLOSURE OF THE INVENTION

Technical Task

A technical task of the present invention is to define HARQ RTT (physical hybrid automatic repeat request round trip time) for a D2D communication and solve a problem of PUCCH resource conflict capable of being occurred in an operation according to the D2D communication.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of transmitting a reception confirmation response, which is transmitted by a user equipment performing a device-to-device communication in a wireless communication system, includes the steps of receiving a physical downlink shared channel and transmitting a reception confirmation response for the physical downlink shared channel on a resource of a physical uplink control channel, wherein the reception confirmation response is transmitted according to an RTT (round trip time) configuration and wherein the RTT configuration is configured according to a user equipment.

To further achieve these and other advantages and in accordance with the purpose of the present invention, according to a second technical aspect of the present invention, a user equipment device performing a device-to-device communication in a wireless communication system includes a reception module and a processor, the processor configured to receive a physical downlink shared channel, the processor configured to transmit a reception confirmation response for the physical downlink shared channel on a resource of a physical uplink control channel, wherein the reception confirmation response is transmitted according to an RTT (round trip time) configuration and wherein the RTT configuration is configured for each user equipment.

The first to the second technical aspect of the present invention can include all or a part of items in the following.

The resource of the physical uplink control channel can be determined according to the number of the RTT configuration and elements including an RTT configuration index set to the user equipment, The elements can include a lowest control channel element index of a physical downlink control channel indicating the physical downlink shared channel and a value delivered via an uplink signaling.

The resource of the physical uplink control channel is determined based on a following formula.

$$n_{PUCCH}^{(1,\tilde{p}=p0)} = n_{CCE} \cdot N_{conf\_RTT} + N_{PUCCH}^{(1)} + n_{RTT\_index}$$

$n_{PUCCH}^{(1,\tilde{p}=p0)}$ may correspond to the resource of the physical uplink control channel in an antenna port $p_0$, $n_{CCE}$ may correspond to a lowest control channel element index of a physical downlink control channel indicating the physical downlink shared channel, $N_{conf\_RTT}$ may correspond to the number of the RTT configuration, $N_{PUCCH}^{(1)}$ may correspond to a value delivered via upper layer signaling and $n_{RTT\_index}$ may correspond to the RTT configuration index set to the user equipment.

The resource of the physical uplink control channel can be determined based on a following formula.

$$n_{PUCCH}^{(1,\tilde{p}=p0)} = n_{CCE} + N_{PUCCH}^{(1)} + n_{DL\_grant}$$

$n_{PUCCH}^{(1,\tilde{p}=p0)}$ may correspond to the resource of the physical uplink control channel in an antenna port $p_0$, $n_{CCE}$ may correspond to a lowest control channel element index of a physical downlink control channel indicating the physical downlink shared channel, $N_{PUCCH}^{(1)}$ may correspond to a value delivered via upper layer signaling and $n_{DL\_grant}$ may correspond to a field value related to a resource region of the physical downlink shared channel.

A resource of a physical downlink control channel can be determined in consideration of a user equipment including an index identical to a lowest control channel element index of the physical downlink control channel indicating the physical downlink shared channel and transmitting the reception confirmation response on a timing identical to a timing of the user equipment.

The RTT configuration may correspond to one of two or more configurations different from each other.

The RTT configuration may be identical to an RTT configuration used by a user equipment communicating with an eNode B within a cell in which the user equipment is included.

Time taken for transmitting the reception confirmation response after the physical downlink shared channel is received in the RTT configuration may be different from time taken for the user equipment communicating with the eNode B to transmit the reception confirmation response after the physical downlink shared channel is received.

The RTT configuration may be different from an RTT configuration used by a user equipment communicating with an eNode B within a cell in which the user equipment is included.

Time taken for transmitting the reception confirmation response after the physical downlink shared channel is received in the RTT configuration can be configured for each user equipment.

The RTT configuration can be determined in consideration of a distance from the user equipment performing the device-to-device communication.

The RTT configuration can be determined in consideration of capability information of the user equipment performing the device-to-device communication.

Advantageous Effects

According to the present invention, since throughput can be enhanced using HARQ RTT, which is newly configured for a D2D communication, a HARQ can be efficiently managed.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

Figure 1:
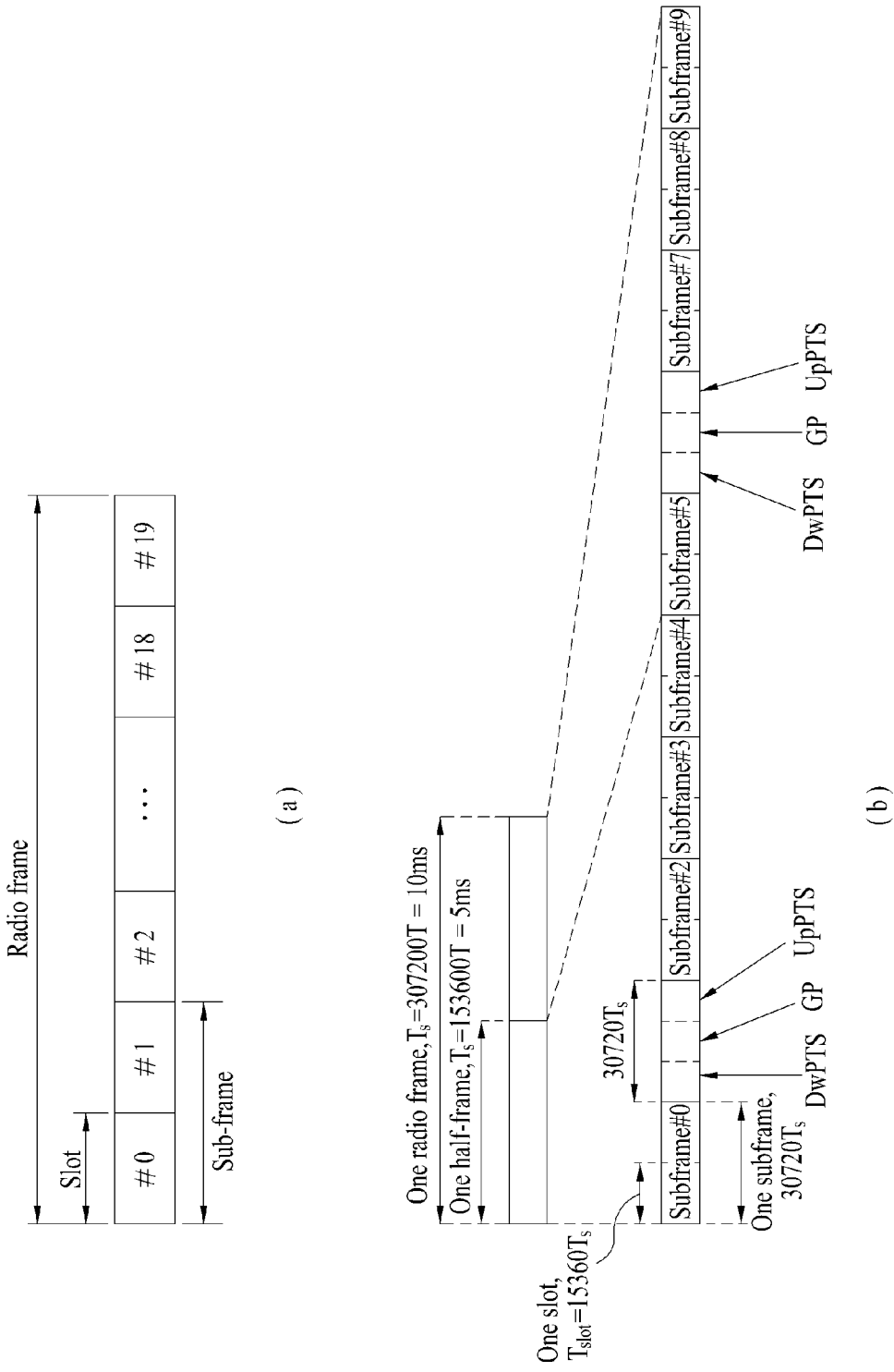
FIG. 1 is a diagram for explaining a structure of a downlink radio frame.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

FIG. 1 is a diagram for explaining a structure of a downlink radio frame. Referring to FIG. 1(a), one radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain. Since 3GPP LTE system uses OFDMA in downlink, OFDM symbol is provided to indicate one symbol period. The OFDM symbol may be named SC-FDMA symbol or symbol period in uplink. Resource block (RB) is a resource allocation unit and may include a plurality of contiguous subcarriers in one slot. The above-described structures of the radio frame are exemplary only. Hence, the number of subframes included in a radio frame, the number of slots included in the subframe and the number of OFDM symbols included in the slot may be modified in various ways.

FIG. 1(b) is a diagram for a structure of a type 2 radio frame. The type 2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in an eNode B and uplink transmission synchronization of a user equipment. The guard period is a period for eliminating interference generated in uplink due to multi-path delay of a downlink signal between uplink and downlink.

In this case, the structures of the radio frame are exemplary only. And, the number of subframes included in a radio frame, the number of slots included in the subframe and the number of symbols included in the slot may be modified in various ways.

Figure 2:
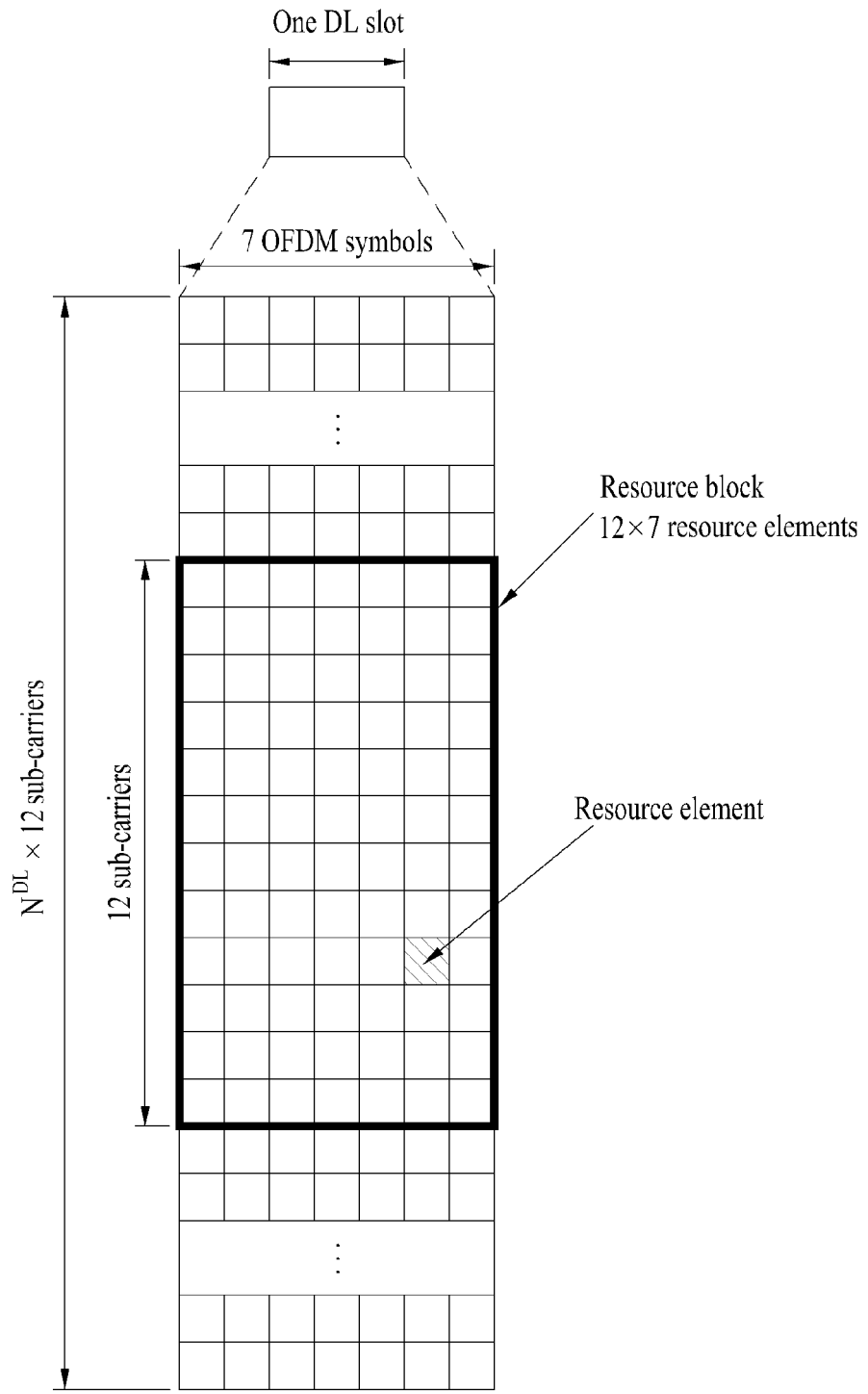
FIG. 2 is a diagram for an example of a resource grid for a downlink (DL) slot.

FIG. 2 is a diagram for an example of a resource grid for a downlink (DL) slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
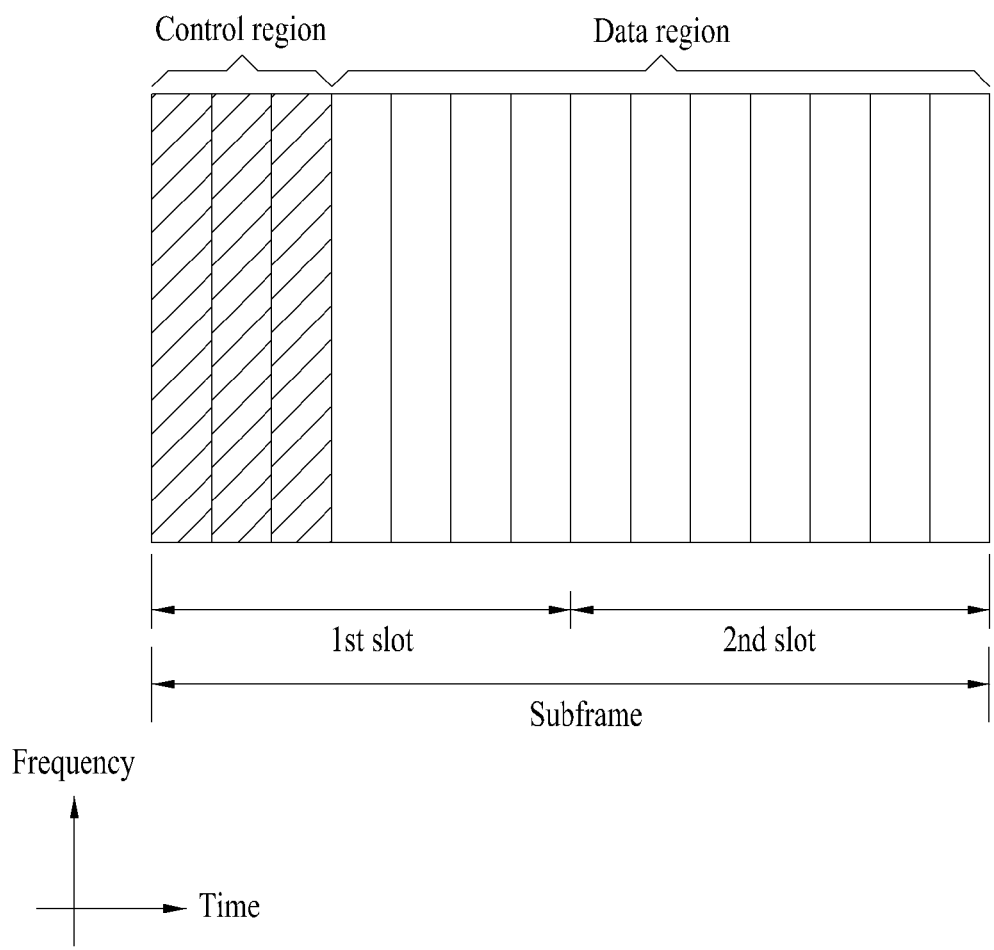
FIG. 3 a diagram for a structure of a downlink (DL) subframe.

FIG. 3 a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and includes information on the number of OFDM symbols used for a transmission of a control channel within the subframe.

The PHICH is a response channel in response to UL transmission and includes an ACK/NACK signal.

Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
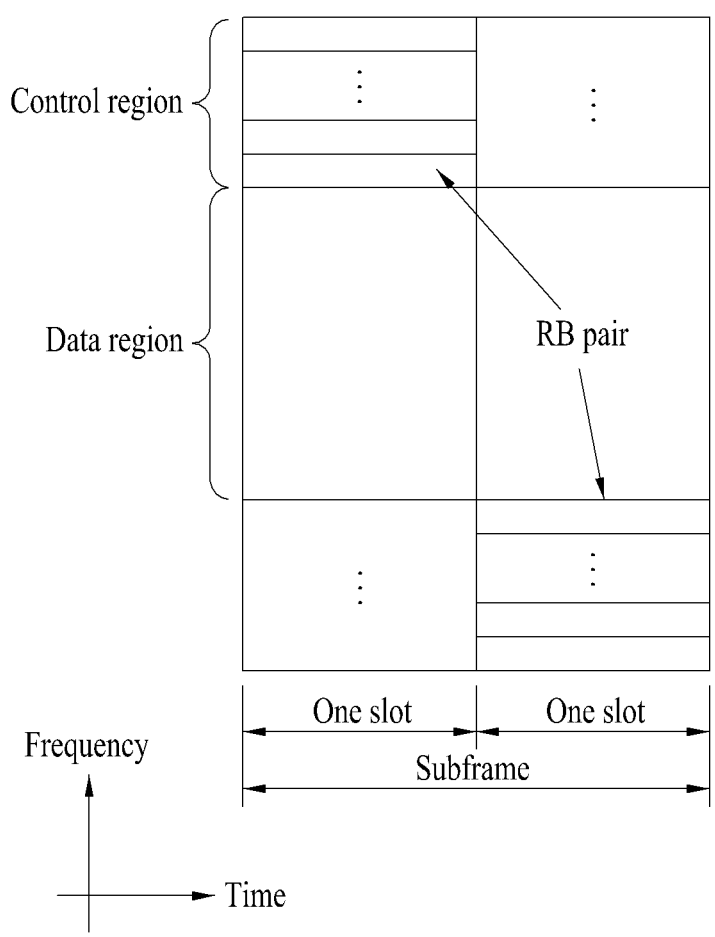
FIG. 4 is a diagram for a structure of an uplink (UL) subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

DCI Format

According to a current LTE-A (release 10), DCI format 0, 1, 1A, 1B, 1C, 1D, 2, 2A, 2B, 2C, 3, 3A, and 4 are defined. In this case, the DCI format 0, 1A, 3, and 3A are regulated to have an identical message size to reduce the numbers of blind decoding, which shall be described later. The DCI formats can be classified into i) DCI format 0 and 4 used for UL scheduling grant, ii) DCI format 1, 1A, 1B, 1C, 1D, 2, 2A, 2B, 2C used for DL scheduling assignment, and iii) DCI format 3 and 3A used for a power control command according to a usage of control information to be transmitted.

In case of the DCI format 0 used for UL scheduling grant, the DCI format 0 can include a carrier offset (carrier indicator) necessary in relation to a carrier aggregation, which is described later, an offset (flag for format 0/format 1A differentiation) used for distinguishing the DCI format 0 from the DCI format 1, a hopping flag (frequency hopping flag) informing of whether a frequency hopping is used in an UL PUSCH transmission, information on resource block assignment, which should be used by a UE to transmit PUSCH, a modulation and coding scheme, a new data offset (a new data indicator) used to empty a buffer for an initial transmission in relation to a HARQ process, a transmit power control command for PUSCH (TPC command for scheduled for PUSCH), cyclic shift information (cyclic shift for DM RS and OCC index) for DMRS (demodulation reference signal), an UL index necessary for performing a TDD operation, channel quality information (channel quality indicator) request information (CSI request), and the like. Meanwhile, since the DCI format 0 uses synchronous HARQ, the DCI format 0 does not include a redundancy version as like DCI formats related to DL scheduling assignment do. The carrier offset is not included in the DCI format if the cross carrier scheduling is not used.

The DCI format 4 is newly added to LTE-A release 10. The DCI format 4 is defined to support that a spatial multiplexing is applied to a UL transmission. Compared to the DCI format 0, since the DCI format 4 further includes informations for the spatial multiplexing, the DCI format 4 has a bigger message size and further includes additional control information in addition to the control information included in the DCI format 0. In particular, the DCI format 4 further includes a modulation and coding scheme for a second transmission block, precoding information for a multi antenna transmission, and sounding reference signal (SRS) request information. Meanwhile, since the DCI format 4 has a size greater than the DCI format 0, the DCI format 4 does not include an offset to distinguish the DCI format 0 from the DCI format 1A.

The DCI format 1, 1A, 1B, 1C, 1D, 2, 2A, 2B, 2C related to a DL scheduling assignment can be mainly divided into 1, 1A, 1B, 1C, and 1D not supporting a spatial multiplexing and 2, 2A, 2B, and 2C supporting the spatial multiplexing.

The DCI format 1C is used for a compact DL assignment and supports a frequency consecutive assignment only. Unlike the other formats, the DCI format 1C does not include a carrier offset and a redundancy version.

The DCI format 1A is a format used for a DL scheduling and a random access procedure. The DCI format 1A can include a carrier offset, an indicator indicating whether a DL distributed transmission is used, PDSCH resource allocation information, a modulation and coding scheme, a redundancy version, a HARQ processor number configured to inform of a processor used for a soft combining, a new data offset used to empty a buffer for an initial transmission in relation to a HARQ process, a transmit power control command for PUCCH, a UL index needed for a TDD operation, and the like.

In case of the DCI format 1, most of control information is similar to that of the DCI format 1A. Yet, while the DCI format 1A is related to a consecutive resource allocation, the DCI format 1 supports a non-consecutive resource allocation. Hence, since the DCI format 1 further includes a resource allocation header, a control signaling overhead may increase a little as a tradeoff for an increase of resource allocation flexibility.

When the DCI format 1B and 1D are compared with the DCI format 1, there exists something in common in that they further include precoding information. The DCI format 1B and the DCI format 1D include PMI confirmation and DL power offset information, respectively. The other control information included in the DCI format 1B and 1D is mostly matched with that of the DCI format 1A.

The DCI format 2, 2A, 2B, and 2C basically include most of the control informations included in the DCI format 1A and further include informations used for a spatial multiplexing. The informations used for the spatial multiplexing correspond to a modulation and coding scheme for a second transmission block, a new data offset, and a redundancy version.

The DCI format 2 supports a closed-loop spatial multiplexing and the DCI format 2A supports an open-loop spatial multiplexing. Both the DCI format 2 and the DCI format 2A include precoding information. The DCI format 2B supports a dual-layer spatial multiplexing combined with a beamforming and further includes cyclic shift information for a DMRS. The DCI format 2C can be understood as an extended version of the DCI format 2B and supports a spatial multiplexing up to eight layers.

The DCI format 3 and 3A can be used to supplement the transmit power control information, which is included in the aforementioned DCI formats configured to perform UL scheduling grant and DL scheduling assignment. In particular, the DCI format 3 and 3A can be used to support a semi-persistent scheduling. In case of the DCI format 3, a command of 1 bit-long is used per UE. In case of the DCI format 3A, a command of 2-bit long is used per UE.

Among the aforementioned DCI formats, a prescribed DCI format is transmitted on PDCCH and a plurality of PDCCHs can be transmitted within a control region. A UE can monitor a plurality of the PDCCHs.

Configuration of Downlink (DL) Control Channel

Basically, first three OFDM symbols of each subframe can be used for a region to which a DL control channel is transmitted and 1 to 3 OFDM symbols can be used depending on an overhead of the DL control channel. In order to control the number of OFDM symbols used for a DL control channel according to each subframe, PCFICH may be used. The PCFICH can be used to provide a confirmation response (positive confirmation response (ACK)/negative confirmation response (NACK)) for UL transmission. And, in order to transmit control information for a DL data transmission or a UL data transmission, PDCCH may be used.

Figure 5:
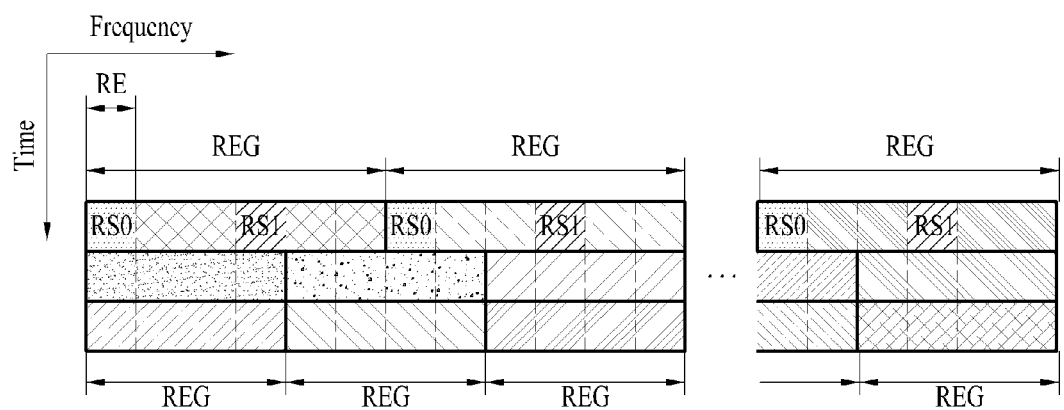
FIG. 5 and FIG. 6 are diagrams for a resource element group (REG) corresponding to a unit to which downlink control channels are assigned.
Figure 6:
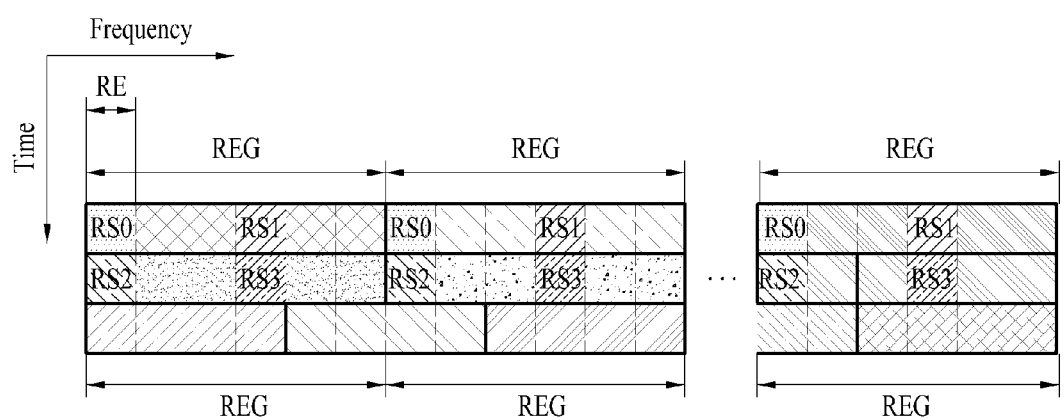

FIG. 5 and FIG. 6 indicate that the aforementioned DL control channels are assigned by a resource element group (REG) unit in a control region of each subframe. FIG. 5 is a diagram for one example of a resource configuration of a DL control channel in a system having 1 or 2 transmitting (Tx) antennas. And, FIG. 6 is a diagram for one example of a resource configuration of a DL control channel in a system having 4 transmitting (Tx) antennas. As depicted in FIG. 5 and FIG. 6, an REG, which is a basic unit to which a control channel is assigned, may include 4 contiguous resource elements in frequency domain except a resource element to which a reference signal is allocated. The specific number of REGs can be used to transmit a DL control channel in accordance with an overhead of the DL control channel.

PCFICH (Physical Control Format Indicator Channel)

PDCCH can be transmitted between an OFDM symbol index 0 and 2 in each subframe to provide resource allocation information of each subframe. Depending on overhead of a control channel, OFDM symbol index 0, OFDM symbol index 0 and 1, or OFDM symbol index 0 to 2 can be used. As mentioned in the foregoing description, the number of OFDM symbols used by the DL control channel is changeable, of which information is indicated by the PCFICH. Therefore, the PCFICH should be transmitted in each subframe.

3 kinds of information can be provided by the PCFICH. Table 1 indicates a CFI (control format indicator) of the PCFICH. A CFI value set to 1 indicates that PDCCH is transmitted on OFDM symbol index 0, a CFI value set to 2 indicates that PDCCH is transmitted on OFDM symbol index 0 and 1, and a CFI value set to 3 indicates that PDCCH is transmitted on OFDM symbol index 0 to 2.

TABLE 1

| CFI | CFI codeword <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information transmitted on PCFICH can be differently defined according to a system bandwidth. For instance, if a system bandwidth is less than a specific threshold, the CFI value set to 1, 2, and 3 may indicate that 2, 3, and 4 OFDM symbols are used for PDCCH, respectively.

Figure 7:
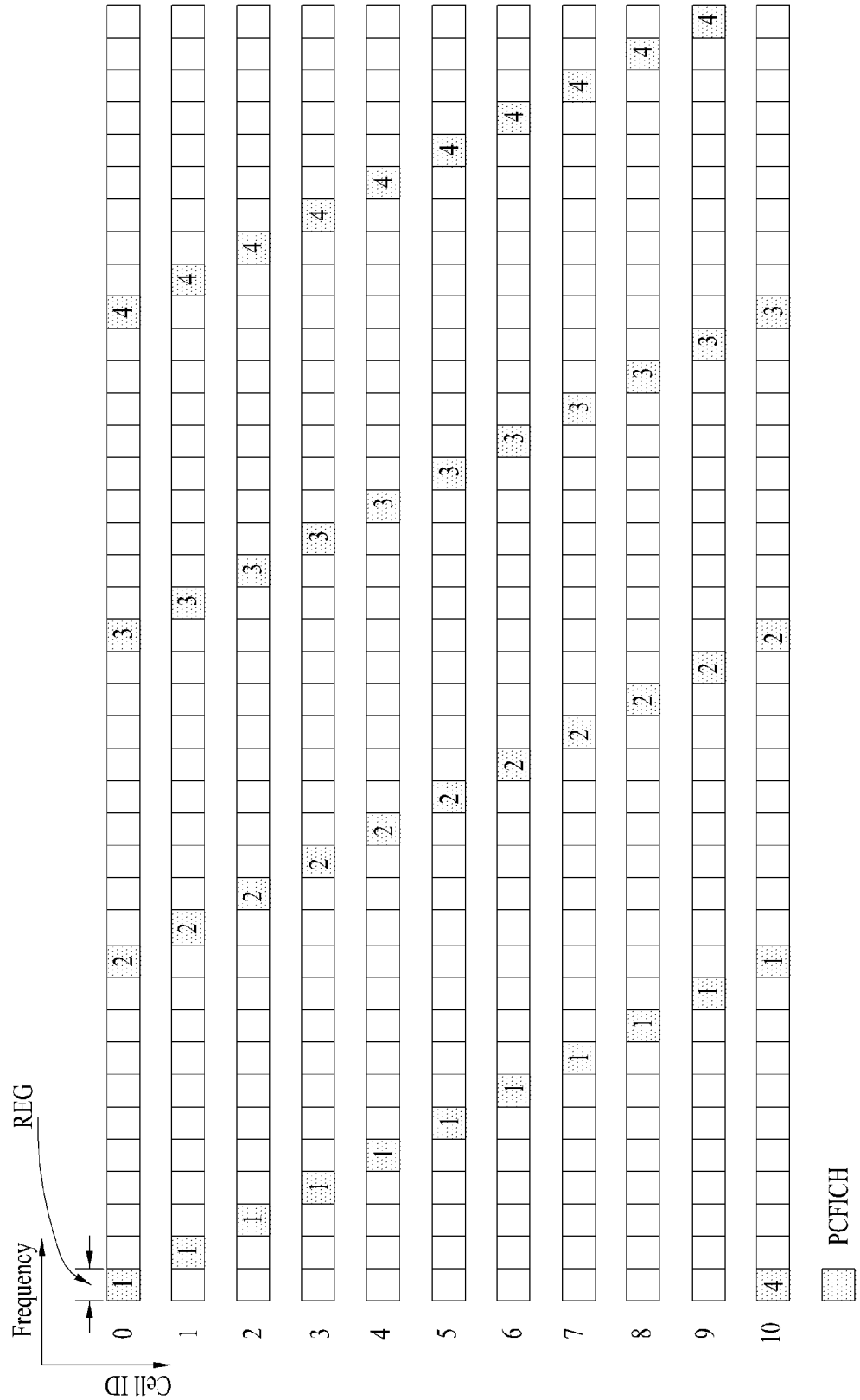
FIG. 7 is a diagram for a type of transmitting a physical control format indicator channel (PCFICH)

FIG. 7 is a diagram for a type of transmitting a physical control format indicator channel (PCFICH). Referring to FIG. 7, REG includes 4 subcarriers, and more particularly, data subcarriers except a reference signal. In general, a transmit diversity scheme can be applied to the REG. In order to prevent inter-cell interference, the REG may be shifted in frequency domain in every cell, i.e., in accordance with a cell ID. In addition, since the PCFICH is transmitted on a first OFDM symbol (OFDM symbol index 0) of a subframe all the time, if a receiver receives the subframe, the receiver preferentially checks information of the PCFICH, identifies the number of OFDM symbols to which PDCCH is transmitted, and then receives control information transmitted on the PDCCH.

PHICH (Physical Hybrid-ARQ Indicator Channel)

Figure 8:
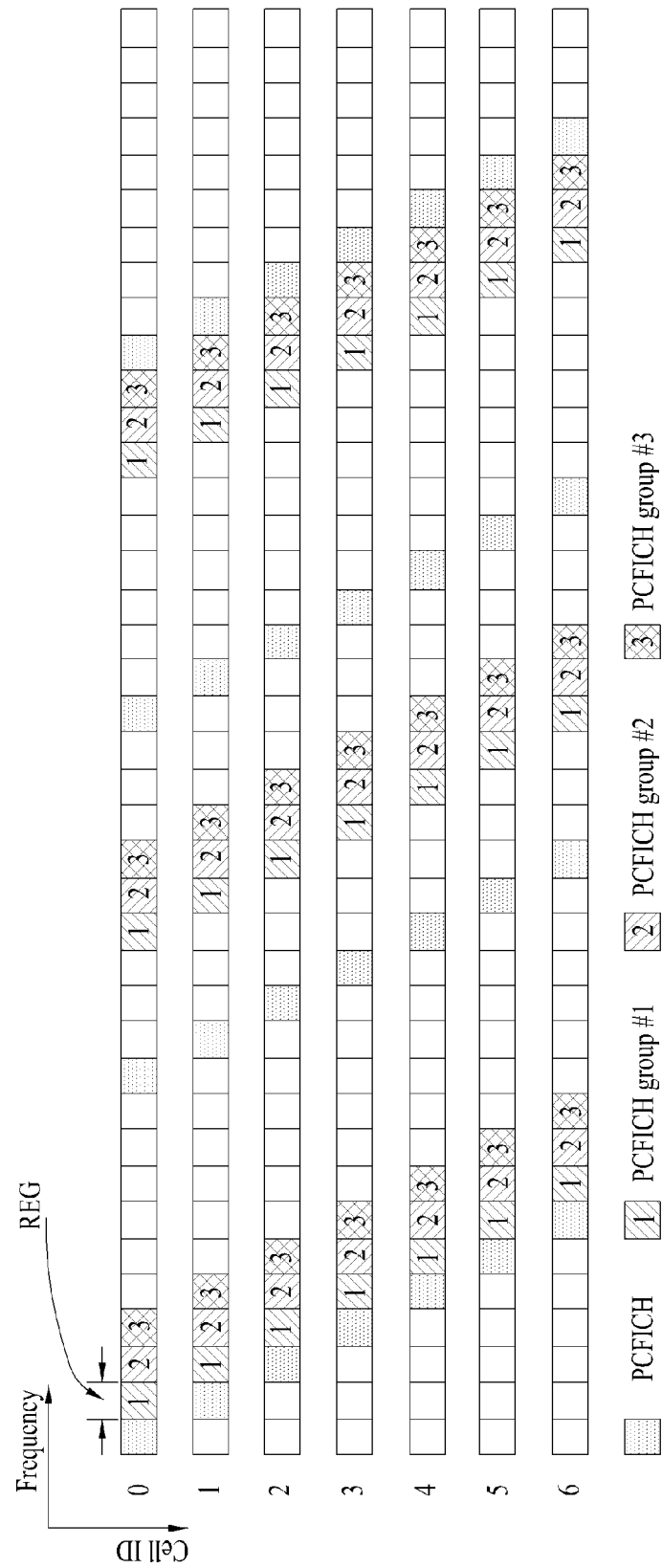
FIG. 8 is a diagram for a position of a PCFICH and a position of a physical HARQ indicator channel (PHICH)
Figure 9:
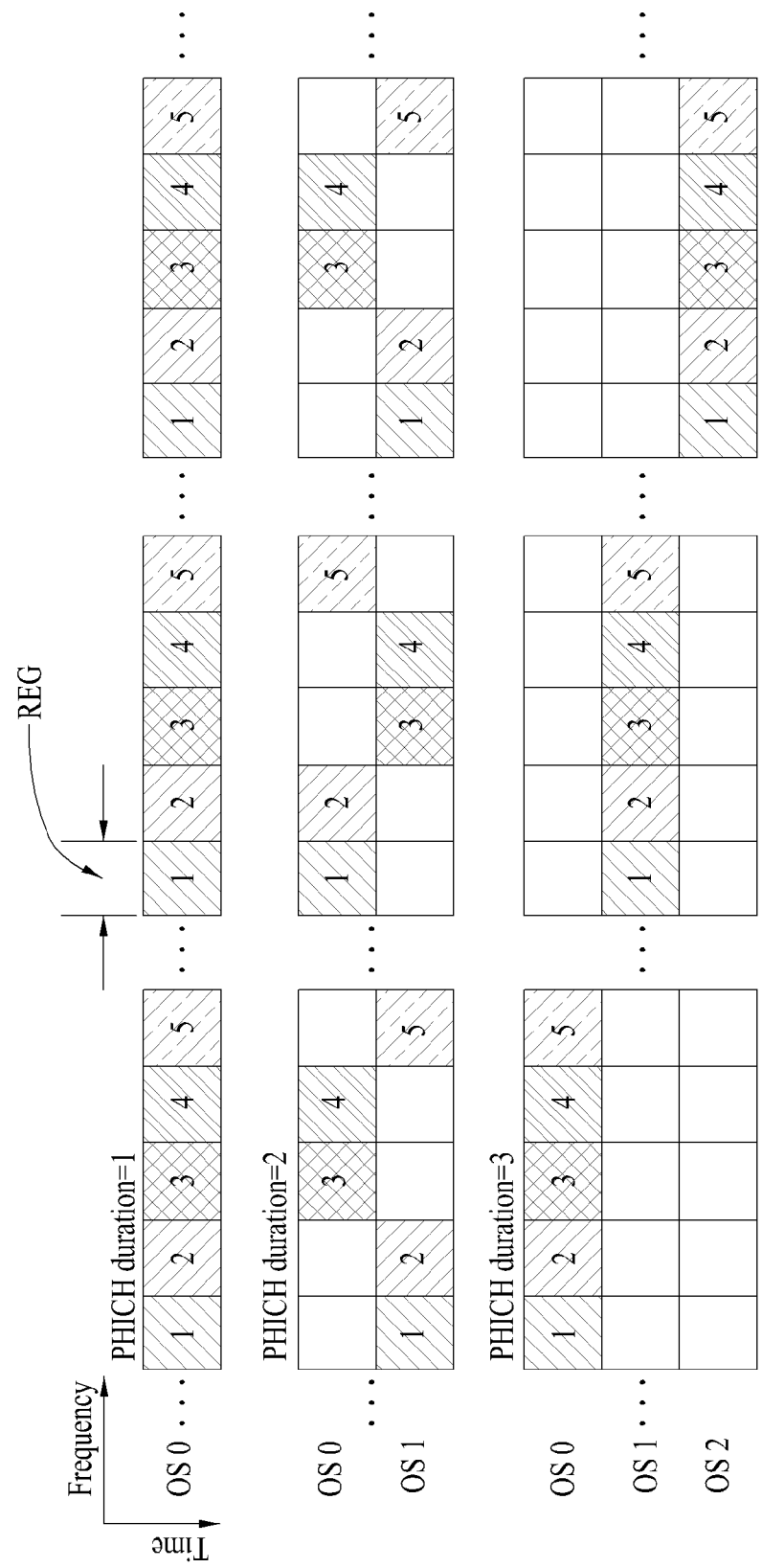
FIG. 9 is a diagram for a position of a downlink resource element to which a PHICH group is mapped.

FIG. 8 is a diagram for a position of a PCFICH and a position of a physical HARQ indicator channel (PHICH) generally applied in a specific bandwidth. First of all, PHICH is a channel that carries ACK/NACK information on a DL data transmission. Pluralities of PHICH groups are formed in one subframe and pluralities of PHICHs exist in one PHICH group. Hence, one PHICH group may include PHICHs for a plurality of user equipments.

As depicted in FIG. 8, PHICH allocation for each user equipment in several PHICH groups is performed using a lowest PRB (physical resource block) index of a PUSCH resource allocation and a cyclic shift index for a demodulation reference signal (DMRS) transmitted on an uplink grant PDCCH. The DMRS is a UL reference signal provided together with UL transmission to perform channel estimation for a UL data demodulation. The PHICH resource is known as such an index pair as ($n_{PHICH}^{group}, n_{PHICH}^{seq}$). In this case, $n_{PHICH}^{group}$ and $n_{PHICH}^{seq}$ in the index pair ($n_{PHICH}^{group}, n_{PHICH}^{seq}$) indicate a PHICH group number and an orthogonal sequence index in the corresponding PHICH group, respectively. The above-mentioned $n_{PHICH}^{group}$ and $n_{PHICH}^{seq}$ may be defined by Formula 1 in the following.

$$n_{PHICH}^{group} = (I_{PRB\_RA}^{lowest\_index} + n_{DMRS}) \bmod N_{PHICH}^{group} + I_{PHICH} N_{PHICH}^{group} \quad \text{[Formula 1]}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

In Formula 1, $n_{DMRS}$ indicates a cyclic shift of DMRS used for a UL transmission related to PHICH and is mapped to a value of a 'cyclic shift for DMRS' field of a latest UL grant control information (e.g., DCI format 0 or 4) on a transport block (TB) related to corresponding PUSCH transmission. For instance, the 'cyclic shift for DMRS' field of the latest UL grant DCI format may have a size of 3-bit. If this field has a value of '000', $n_{DMRS}$ can be configured to have a value of '0'.

In Formula 1, $N_{SF}^{PHICH}$ indicates a size of a spreading factor used for PHICH modulation. $I_{PRB\_RA}^{lowest\_index}$ indicates a lowest PRB index in a first slot used for corresponding PUSCH transmission. $I_{PHICH}$ has a value of '1' on a special case (UL/DL configuration is set to '0' and PUSCH is transmitted in $4^{th}$ or $9^{th}$ subframe) in a TDD system. Otherwise, $I_{PHICH}$ has a value of '0'. $N_{PHICH}^{group}$ indicates the number of PHICH group(s) configured by an upper layer and can be defined by Formula 2 in the following.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Formula 2]}$$

In Formula 2, $N_g$ indicates information on a size of PHICH resource transmitted on PBCH (Physical Broadcast Channel). $N_g$ has a size of 2-bit and is represented as ($N_g \in \{1/6, 1/2, 1, 2\}$). In Formula 2, $N_{RB}^{DL}$ indicates the number of resource block(s) configured in DL.

Table 2 shows one example of an orthogonal sequence defined by a legacy 3GPP LTE release 8/9.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

HARQ (Hybrid Automatic Repeat Request)

In the following, a channel coding and a HARQ technique are explained.

As one of techniques used for a reliable transmission, a forward error correction (FEC) code can be used. In this case, when a receiving end finishes demodulation, information can be restored by a decoding procedure. For a channel coding, such various types of coding techniques as a convolutional coding, a block coding, a turbo coding and the like can be used. In the following, the turbo coding technique is explained. A turbo code can include two recursive systematic convolutional codes connected with an interleaver. An output code bit can include a systematic bit and a parity bit. According to an actual communication system, since a data block of big size is hard to implement, the data block is simplified by a plurality of coding blocks. And then, a practical channel encoding (encoding) is performed in a code block unit. After the encoding is finished, coded bits undergo a channel interleaver to prepare for a burst error. Subsequently, a rate matching procedure is performed to match a resource actually transmitted. The rate matching can be individually performed for the systematic bit and the parity bit, respectively. The rate matching via a circular buffer can be performed as follows.

For a given coding rate, a part of data bit of a circular buffer is circularly transmitted. If a non-duplicated part of the data bit is transmitted again, a coding gain (i.e., 'incremental redundancy' gain) can be obtained. A hybrid automatic repeat request (HARQ) scheme is a combination of a channel coding and an automatic repeat-request (ARQ) technique and can enhance system performance. If a receiving end successfully decodes a data block, a positive response (ACK) signal is transmitted to a transmitting end. Otherwise (i.e., if decoding fails), the receiving end transmits a negative response (NACK) signal to the transmitting end. The transmitting end transmits the data block again in response to the negative response signal (NACK). After the positive response (ACK) signal is received, if the transmitting end has data to transmit, the transmitting end can transmit new data.

A HARQ operation can be divided into a synchronous HARQ and an asynchronous HARQ according to transmission timing. Since retransmission timing is not fixed in the asynchronous HARQ, an indicator indicating whether a current transmission corresponds to a retransmission is required in the asynchronous HARQ. On the contrary, if an initial transmission fails in the synchronous HARQ, a retransmission is always performed after 8 times (if 8 HARQ processes exist) of transmission interval from the initial transmission.

As a different method of classifying the HARQ, the HARQ can be classified according to a redundancy version. One is a chase combining (CC) technique and another is an incremental redundancy (IR) technique.

According to a HARQ of a CC type, since an identical data is transmitted in every retransmission, signal to noise ratio gain can be obtained. On the contrary, according to a HARQ of an IR type, since a redundancy version different from a previous transmission is transmitted when a retransmission is performed, coding gain can be obtained.

If a HARQ technique is applied to a system using a circular buffer rate matching, the IR type can be implemented as a scheme indicating a start point of a retransmitted data block. A start point of a circular buffer can be defined by each redundancy version (RV).

HARQ RTT (Round Trip Time)

When a DL/UL HARQ is performed in a wireless communication system, a HARQ RTT can be defined by time taken from timing of transmitting data to a destination station by a source station to timing immediately before transmitting data by the source station after ACK/NACK information is received from the destination station.

HARQ RTT can be defined by Formula 3 in the following.

$$RTT_{HARQ} = T_{sd} + T_p + T_{dp} + T_{da} + T_p + T_{sp} \quad [\text{Formula 3}]$$

In Formula 3, $T_{sd}$ indicates transmission time on which data is transmitted by the source station. $T_p$ indicates a propagation delay corresponding to time taken from timing of transmitting data by the source station to timing of receiving data by the destination station. $T_{dp}$ indicates processing time corresponding to time taken for generating ACK/NACK by receiving data from the destination station. $T_{da}$ indicates time on which ACK/NACK information is transmitted to the source station by the destination station. $T_p$ indicates propagation delay corresponding to time taken for the source station to receive the ACK/NACK information transmitted by the destination station. $T_{sp}$ indicates processing time corresponding to time taken for the source station to generate data to be transmitted next time with the received ACK/NACK information.

According to a legacy LTE/LTE-A system, 8 subframes (or ms) are used for the HARQ RTT and 4 subframes are used for time between timing of transmitting data by the source station and timing of transmitting ACK/NACK by the destination station. Yet, the time is determined in consideration of relationship between an eNode B and a user equipment. As mentioned in the foregoing description, in the D2D according to the coordination type, RTT can be newly defined in consideration of a distance between user equipments performing the D2D communication, capability of a user equipment and the like. Hence, a proposal for a configuration of HARQ RTT for the D2D and a solution for a conflict problem and the like, which may occur in case of configuring the HARQ RTT for the D2D, are sequentially explained in the following.

Configuration of HARQ RTT for D2D

As mentioned in the foregoing description, a D2D system can be classified into a system receiving coordination from an eNode B/network and a system not receiving the coordination from the eNode B/network.

Figure 10:
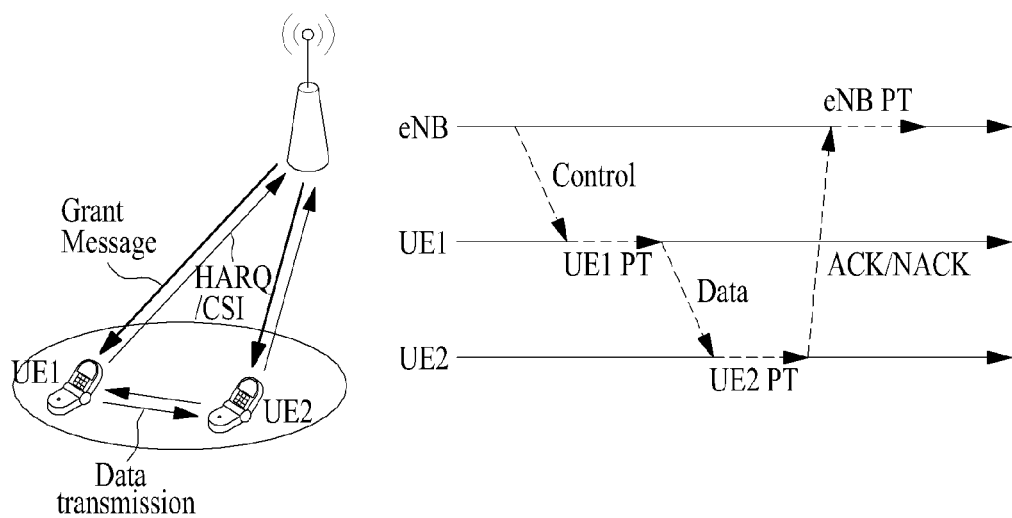
FIGS. 10 to 13 are diagrams for explaining embodiments of the present invention.

First of all, referring to FIG. 10, a D2D communication can be performed by receiving coordination of an eNode B/network. In particular, data is transmitted via the D2D only and resource allocation information (grant message), HARQ, CSI information and the like can be transmitted via the eNode B. In order for a UE 1 and a UE 2 to perform the D2D communication with each other, the UE 1 and the UE 2 should undergo the eNode B. Hence, HARQ RTT can be represented by Formula 4 in the following.

$$RTT_{HARQ}^1 = T_{eNBg} + T_{p1} + T_{UE1p} + T_{p2} + T_{UE2p} + T_{UE2a} + T_{p3} + T_{eNBp}$$ [Formula 4]

In Formula 4, $T_{eNBg}$ indicates time on which downlink allocation is transmitted to a user equipment by the eNode B. $T_{p1}$ indicates a propagation delay corresponding to time taken from timing of transmitting downlink allocation by the eNode B to timing of receiving the downlink allocation by the UE 1. $T_{UE1p}$ indicates processing time corresponding to time taken for the UE 1 to receive the downlink allocation and transmit data to the UE 2. $T_{UE1d}$ indicates transmission time on which data is transmitted by the UE 1. $T_{p2}$ indicates a propagation delay corresponding to time taken until the UE 2 receives the data transmitted by the UE 1. $T_{UE2p}$ indicates processing time corresponding to time taken for the UE 2 to receive the data and generate ACK/NACK. $T_{UE2a}$ indicates time on which ACK/NACK information is transmitted to the eNode B by the UE 2. $T_{p3}$ indicates a propagation delay corresponding to time taken for the eNode B to receive the ACK/NACK information transmitted by the UE 2. $T_{eNBp}$ indicates processing time corresponding to time taken for the eNode B to generate downlink allocation to be transmitted next time with the received ACK/NACK information. The propagation delay can be determined according to a D2D communication radius.

Figure 11:
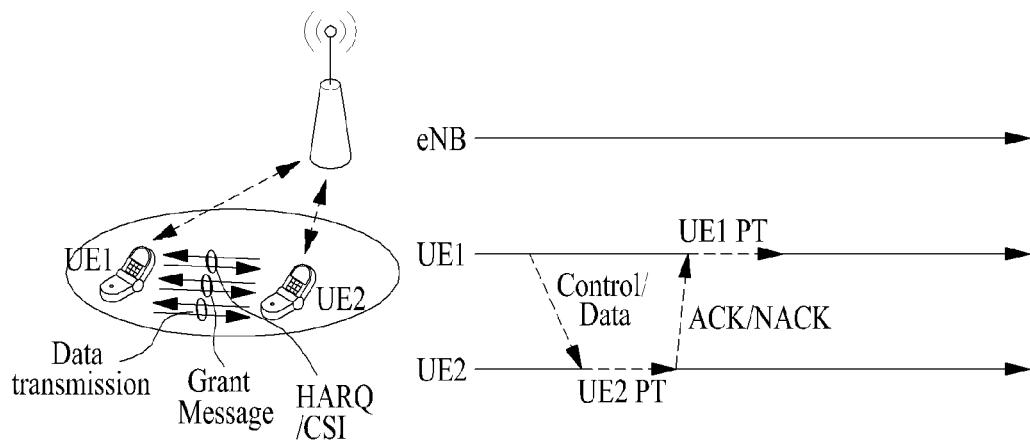

FIG. 11 shows a case that a D2D communication is performed without coordination of the eNode B/network. In this case, as shown in FIG. 11, resource allocation information, HARQ, CSI information and the like as well as data can be transmitted via the D2D communication.

In this case, HARQ RTT and $RTT^2_{HARQ}$ can be determined by Formula 5 in the following.

$$RTT^2_{HARQ} = T_{UE1gd} + T_{p1} + T_{UE2p} + T_{UE2a} + T_{p2} + T_{UE1p}$$ [Formula 5]

$T_{UE1gd}$ indicates time on which resource allocation information and data are transmitted to the UE 2 by the UE 1. $T_{p1}$ indicates a propagation delay corresponding to time taken from timing of transmitting the resource allocation information and data by the UE 1 to timing of receiving the resource allocation information and data by the UE 2. $T_{UE2p}$ indicates processing time corresponding to time taken for the UE 2 to receive the data and generate ACK/NACK. $T_{UE2a}$ indicates time on which ACK/NACK information is transmitted to the UE 1 by the UE 2. $T_{p2}$ indicates a propagation delay corresponding to time taken for the UE 1 to receive the ACK/NACK information transmitted by the UE 2. $T_{UE1p}$ indicates processing time corresponding to time taken for the UE 1 to generate resource allocation information and data to be transmitted next time with the received ACK/NACK information. The propagation delay can be determined according to a D2D communication radius.

Configuration and Relationship of HARQ RTT for D2D and B2D

First of all, a value of HARQ RTT for a B2D communication and a value of HARQ RTT for a D2D communication can be identically configured. The identical value corresponds to a bigger value among a HARQ RTT value taken for the B2D communication and a HARQ value taken for the D2D communication. The identical value can be configured as the HARQ RTT of the B2D communication and the D2D communication. For instance, if the HARQ RTT corresponds to 8 (subframes (or, ms)) in the B2D communication and the HARQ RTT corresponds to 10 (subframes (or, ms)) in the D2D communication, 10 (subframe (or, ms)) may be configured as the HARQ RTT for the B2D and D2D communication. As a different example, if it takes 8 (subframes (or, ms)) for the B2D communication, since time for HARQ in the D2D communication is shortly taken compared to time for HARQ in the B2D communication, it may takes 6 (subframes (or, ms)) for the D2D communication. In this case, 8 (subframes (or, ms)) can be configured as the HARQ RTT value for the B2D and the D2D communication.

Secondly, a value of HARQ RTT for the B2D communication and a value of HARQ RTT for the D2D communication can be differently configured. According to the aforementioned first example, since a communication, which has a short HARQ RTT and takes short time for transmitting a single transport block, uses a long HARQ RTT, throughput may be deteriorated. Hence, total throughput of a system can be enhanced in a manner of differently configuring the HARQ RTT of the B2D communication and the HARQ RTT of the D2D communication.

For instance, the HARQ RTT of the B2D communication may correspond to 8 (subframes (or, ms)) and the HARQ RTT of the D2D communication may correspond to 10 (subframes (or, ms)). In this case, the HARQ RTT of the B2D communication and the HARQ RTT of the D2D communication can be configured to 8 (subframes (or, ms)) and 10 (subframes (or, ms)), respectively in a manner of being different from each other.

Figure 12:
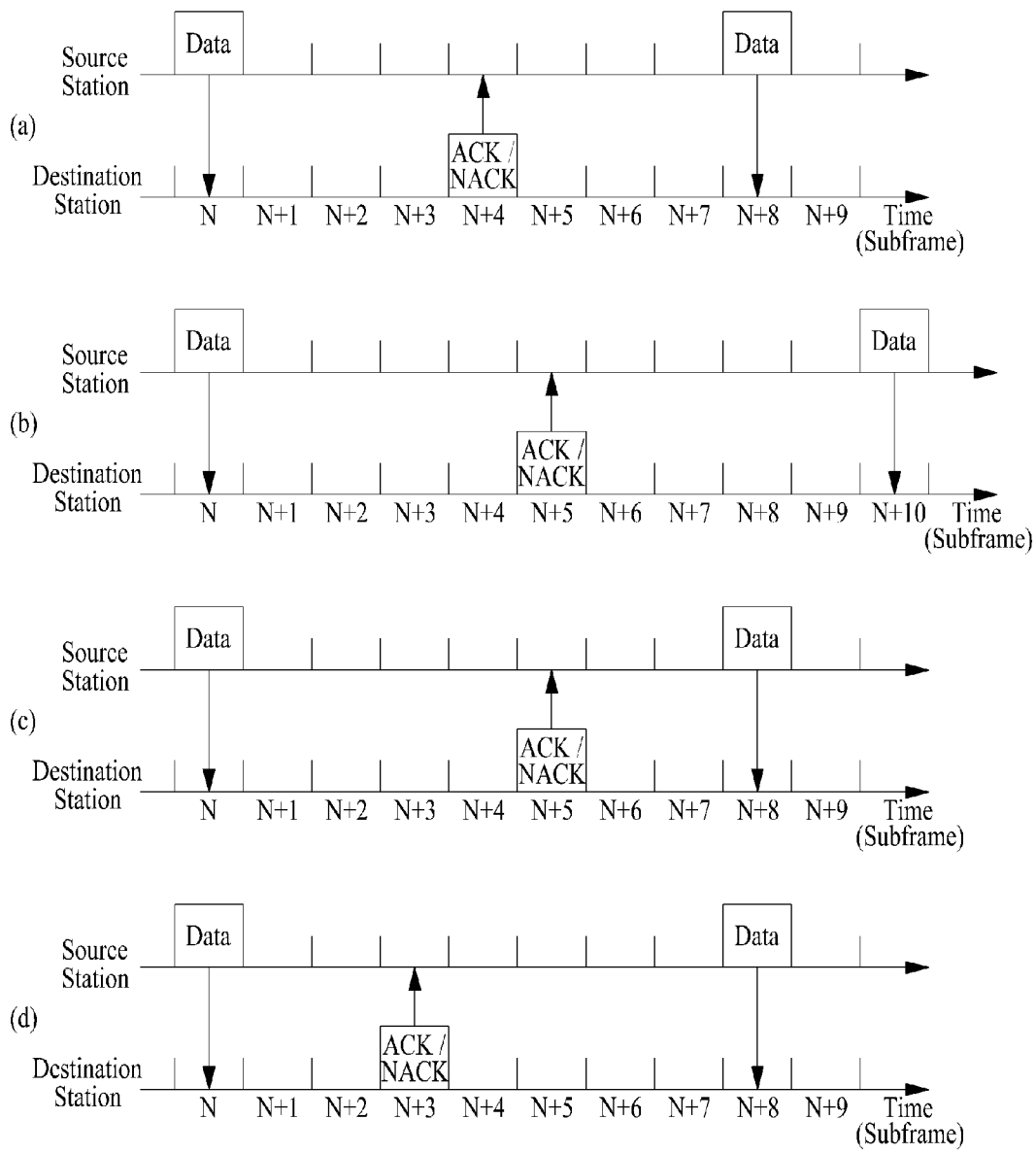

Thirdly, in the HARQ RTT configured for the B2D communication and the D2D communication, time taken before ACK/NACK is transmitted and time taken after the ACK/NACK is transmitted can be identically configured. For instance, as shown in FIG. 12(a), (HARQ, time taken before the ACK/NACK is transmitted) can be configured as (8, 4). In particular, the time taken before the ACK/NACK is transmitted and the time taken after the ACK/NACK is transmitted can be identically configured by 4 (subframes (or, ms)). As a different example, as shown in FIG. 12(b), (HARQ, time taken before the ACK/NACK is transmitted) can be configured as (10, 5). In particular, the time taken before the ACK/NACK is transmitted and the time taken after the ACK/NACK is transmitted can be identically configured by 5 (subframes (or, ms)).

Fourthly, in the HARQ RTT configured for the B2D communication and the D2D communication, time taken before ACK/NACK is transmitted and time taken after the ACK/NACK is transmitted can be differently configured. For instance, as shown in FIG. 12(c), (HARQ, time taken before the ACK/NACK is transmitted) can be configured as (8, 5). As a different example, as shown in FIG. 12(d), (HARQ, time taken before the ACK/NACK is transmitted) may be configured as (8, 3).

The aforementioned third and fourth example can be used as a form additionally applied to the aforementioned first and second example or an independent form.

In the meantime, the HARQ RTT for the B2D and the D2D communication can be configured by a cell-common (cell/RRH/C-RAN-common) or UE-specific value based on the aforementioned content.

First of all, the HARQ RTT for the B2D and the D2D communication can be configured by a cell-common value. In this case, as mentioned in the foregoing description, the HARQ RTT for the B2D communication and the HARQ RTT for the D2D communication can be identically or differently configured.

Secondly, the HARQ RTT for the B2D and the D2D communication can be configured by a UE-specific value. In this case, as mentioned in the foregoing description, the HARQ RTT for the B2D communication and the HARQ RTT for the D2D communication can be identically or differently configured. And, the HARQ RTT for the B2D communication and the HARQ RTT for the D2D communication can be differently configured according to capability of a user equipment. For instance, since processing time and the like are affected by according to whether a user equipment uses MIMO, the HARQ RTT can be identically or differently configured in consideration of the capability of the user equipment. And, the HARQ RTT can be identically or differently configured in consideration of performance of a decoder used by the user equipment.

Figure 13:
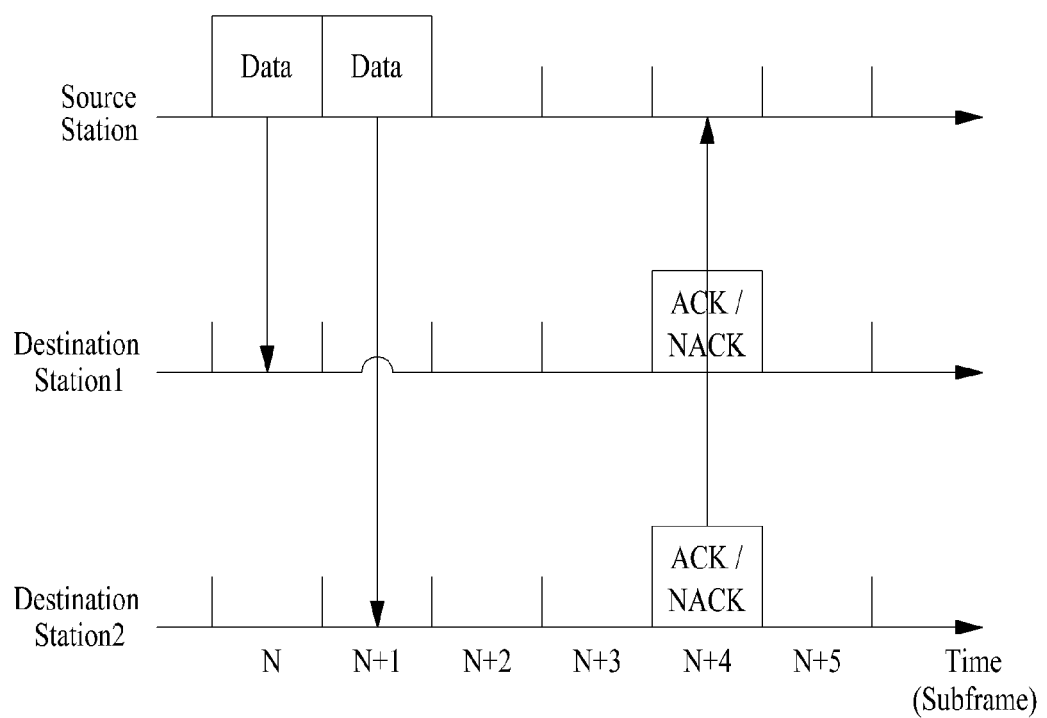

The HARQ RTT for the B2D communication and the HARQ RTT for the D2D communication can be differently configured in an identical cell according to a user equipment. In this case, resource conflict of PUCCH carrying ACK/NACK may occur. Regarding this, it shall be described in more detail with reference to FIG. 13. Referring to FIG. 13, a source station transmits data to a destination station 1 and 2 on PUSCH, respectively. In this case, assume that HARQ RTT is differently configured for the destination station 1 and the destination station 2. In other word, (HARQ RTT 1, time taken before ACK/NACK is transmitted) of the destination station 1 may be configured as (8, 4) and (HARQ RTT 2, time taken before ACK/NACK is transmitted) of the destination station 2 may be configured as (8, 3). In this case, although the HARQ RTT 1 and the HARQ RTT 2 may have values different from the aforementioned example, assume that the time taken before ACK/NACK is transmitted is different from each other. Consequently, the source station transmits data to the destination station 1 in a subframe N and transmits data to the destination station 2 in a subframe N+1. The destination station 1 will transmit ACK/NACK in a subframe N+4 and the destination station 2 will also transmit ACK/NACK in the subframe N+4. When the source station transmits data to the destination station 1 and 2, if a lowest CCE index of PDCCH, which indicates PUSCH, is identical to each other, the destination station 1 and 2 will transmit ACK/NACK in an identical subframe N+4 via an identical PUCCH resource. This means resource conflict of PUCCH and it is highly probable for the source station not to normally receive the ACK/NACK from each of the destination stations.

In the following, a method of allocating a PUCCH resource to solve the aforementioned problem is explained in detail.

Solution for PUCCH Conflict

In order to solve the aforementioned PUCCH conflict problem, PUCCH resources can be separately used according to HARQ RTT by methods exemplified in the following.

As a first example, the PUCCH resources can be used in a manner of being divided according to a slot in accordance with HARQ RTT. For instance, a PUCCH resource on an odd number slot can be used to make user equipments where (HARQ RTT, time taken before ACK/NACK is transmitted) corresponds to (8, 4) transmit ACK/NACK information and a PUCCH resource on an even number slot can be used to make user equipments configured by remaining HARQ RTT transmit ACK/NACK information.

As a second example, a region using a PUCCH resource can be used in a manner of being divided into a static/persistent region and a dynamic region according to HARQ RTT. For instance, a static PUCCH resource makes user equipments where (HARQ RTT, time taken before ACK/NACK is transmitted) corresponds to (8, 4) transmit ACK/NACK information and a dynamic resource can make user equipments configured by remaining HARQ RTT transmit ACK/NACK information.

As a third example, regions used by a PUCCH resource can be distinguished from each other by a predetermined method according to HARQ RTT. More specifically, when a PUCCH resource is determined, it may consider the number of RTT configuration, an index of RTT configuration set to a user equipment, a lowest CCE index of PDCCH indicating PUSCH and the like. For instance, in case of PUCCH format 1/1a/1b, a PUCCH resource of which an antenna port $p_0$ is used can be determined using Formula 6 in the following.

$$n_{PUCCH}^{(1,\tilde{p}=p0)}=n_{CCE} \cdot N_{conf\_RTT}+N_{PUCCH}^{(1)}+n_{RTT\_index} \quad \text{[Formula 6]}$$

In Formula 6, $n_{PUCCH}^{(1,\tilde{p}=p0)}$ indicates a PUCCH resource in an antenna port $p_0$. $n_{CCE}$ indicates a lowest control channel element index of PDCCH indicating the PUSCH. $N_{conf\_RTT}$ indicates the number of RTT configuration. $N_{PUCCH}^{(1)}$ indicates a value delivered via upper layer signaling. $n_{RTT\_index}$ indicates an RRT configuration index configured to the user equipment. An eNode B can inform each of user equipments of $N_{conf\_RTT}$ and/or $n_{RTT\_index}$ via L1/L2 signaling, L2/L3 signaling, system information or the like. In this case, $N_{conf\_RTT}$ and $n_{RTT\_index}$ may correspond to a cell-common value and a UE-specific value, respectively. According to the aforementioned method, since an amount of resources to be used among PUCCH resources can be controlled by a reserved form according to the $N_{conf\_RTT}$, waste of resource can be efficiently controlled.

In case of PUCCH format 1/1a/1b, a PUCCH resource of which an antenna port $p_1$ is used can be determined using Formula 7 in the following.

$$n_{PUCCH}^{(1,\tilde{p}=p1)}=n_{CCE} \cdot N_{conf\_RTT}+N_{PUCCH}^{(1)}+n_{RTT\_index}+1 \quad \text{[Formula 7]}$$

$n_{PUCCH}^{(1,\tilde{p}=p1)}$ indicates a PUCCH resource in an antenna port $p_1$. Parameters used in Formula 7 have a meaning identical to the meaning of the parameters used in Formula 6.

As a different example, a PUCCH resource can be allocated using a downlink allocation field value indicating PDSCH. The downlink allocation field value may include i) a TPC field in a DCI format, ii) a DAI field in the DCI format, iii) a cyclic shift for DM RS and OCC index field, iv) a CSI request field, vi) an SRS request field and the like. It may be represented as Formula 8 in the following.

$$n_{PUCCH}^{(1,\tilde{p}=p0)}=n_{CCE}+N_{PUCCH}^{(1)}+n_{DL\_grant} \quad \text{[Formula 8]}$$

In Formula 8, $n_{PUCCH}^{(1,\tilde{p}=p0)}$ indicates a PUSCH resource in an antenna port $p_0$. $n_{CCE}$ indicates a lowest control channel element index of PDCCH indicating the PUSCH. $N_{PUCCH}^{(1)}$ indicates a value delivered via upper layer signaling. $n_{DL\_grant}$ indicates a field (downlink allocation field) related to a resource region of the PDSCH.

As shown in Formula 8, regarding a PUSCH resource in an antenna port $p_1$, a PUCCH resource can be allocated using a downlink allocation field indicating PDSCH.

As a fourth example, a PUCCH resource can be allocated according to HARQ RTT using an explicit method. This can be informed using an RRC or an MAC signal. For instance, it may directly inform a PUCCH resource index. Or, as shown in Formula 9, it may inform $n_{UE}$ corresponding to a UE-specific signal used for determining the PUCCH resource index.

$$n_{PUCCH}^{(1,\tilde{p})}=n_{CCE}+N_{PUCCH}^{(1)}+n_{UE} \quad \text{[Formula 9]}$$

As a fifth example, ACK/NACK information can be transmitted on PUSCH instead of PUCCH. In particular, in case that PUCCH resource conflict occurs, the ACK/NACK information can be transmitted on PUSCH using a HARQ- ACK piggyback method in advance. Or, a resource used for transmitting the ACK/NACK information on PUSCH can be explicitly informed.

Figure 14:
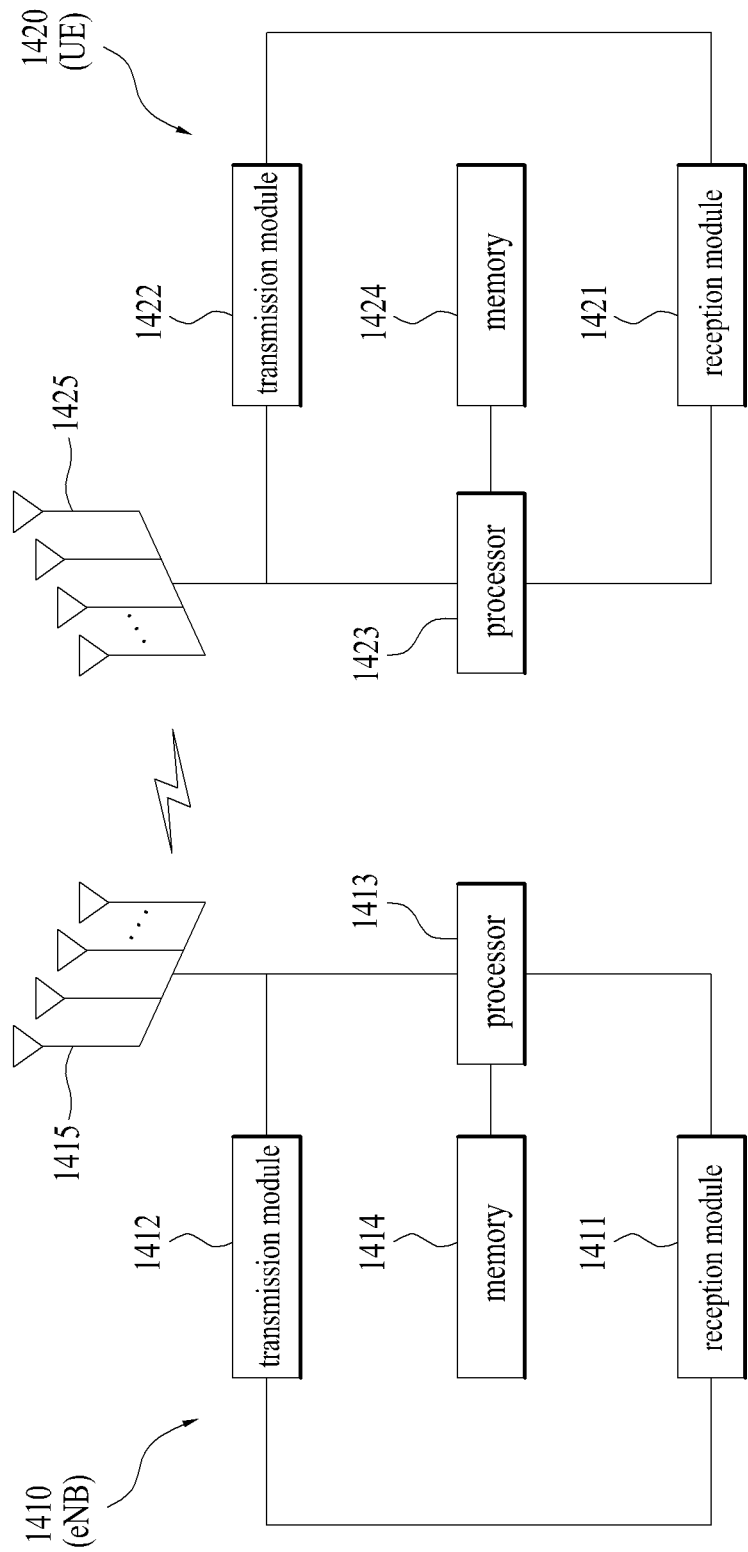
FIG. 14 is a diagram for a configuration of an eNode B and a user equipment according to the present invention.

FIG. 14 is a diagram for a configuration of an eNode B and a user equipment according to the present invention.

Referring to FIG. 14, the eNode B 1410 according to the present invention includes a reception module 1411, a transmission module 1412, a processor 1413, a memory 1414, and a plurality of antennas 1415. A plurality of the antennas 1415 means the eNode B capable of supporting MIMO transmission and reception. The reception module 1411 can receive various signals, a data, and information in UL from the UE. The transmission module 1412 can transmit various signals, a data, and information in DL to the UE. The processor 1413 can control overall operations of the eNode B 1410 and can operate to implement the aforementioned embodiment of the present invention.

Besides, the processor 1413 of the eNode B 1410 is configured to perform a function of processing information received by the eNode B 1410, information to be transmitted to an external, and the like. The memory 1414 is configured to store the processed information for a prescribed time and can be substituted by such a configuration element as a buffer (not depicted), or the like.

Subsequently, referring to FIG. 14, the UE 1420 according to the present invention includes a reception module 1421, a transmission module 1422, a processor 1423, a memory 1424, and a plurality of antennas 1425. A plurality of the antennas 1425 means the UE capable of supporting MIMO transmission and reception. The reception module 1421 can receive various signals, a data, and information in DL from the eNode B. The transmission module 1422 can transmit various signals, a data, and information in UL to the eNode B. The processor 1423 can control overall operations of the UE 1420 and can operate to implement the aforementioned embodiment of the present invention.

Besides, the processor 1423 of the UE 1420 is configured to perform a function of processing information received by the UE 1420, information to be transmitted to an external, and the like. The memory 1424 is configured to store the processed information for a prescribed time and can be substituted by such a configuration element as a buffer (not depicted), or the like.

Detail configuration of the eNode B and the UE can be implemented to independently apply the aforementioned contents explained in various embodiments of the present invention or to simultaneously apply two or more embodiments. The overlapped contents are omitted for clarity of explanation.

And, in explaining FIG. 14, explanation on the eNode B 1410 can be identically applied to a device as a main agent of DL transmission or a main agent of UL reception. Explanation on the UE 1420 can be identically applied to a relay as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

Although the aforementioned explanation describes the present invention in a manner of mainly concerning a form applied to a 3GPP LTE mobile communication system, the present invention can be used for various kinds of mobile communication systems with an identical or an equivalent principle.

What is claimed is:

1. A method of transmitting a reception confirmation response, which is transmitted by a user equipment performing a device-to-device communication in a wireless communication system, comprising the steps of:

receiving a physical downlink shared channel; and transmitting a reception confirmation response for the physical downlink shared channel on a resource of a physical uplink control channel, wherein the reception confirmation response is transmitted according to an RTT (round trip time) configuration and wherein the RTT configuration is configured for each user equipment, wherein the resource of the physical uplink control channel is determined based on the following formula $n_{PUCCH}^{(1,p=p0)} = n_{CCE} \cdot N_{conf\_RTT} + N_{PUCCH}^{(1)} + n_{RTT\_index}$, wherein $n_{PUCCH}^{(1,p=p0)}$ corresponds to the resource of the physical uplink control channel in an antenna port p0, wherein $n_{CCE}$ corresponds to a lowest control channel element index of a physical downlink control channel indicating the physical downlink shared channel, wherein $N_{conf\_RTT}$ corresponds to the number of the RTT configuration, wherein $N_{PUCCH}^{(1)}$ corresponds to a value delivered via upper layer signaling, and wherein $n_{RTT\_index}$ corresponds to the RTT configuration index set to the user equipment.

2. The method of claim 1, wherein a resource of a physical downlink control channel is determined in consideration of a user equipment comprising an index identical to a lowest control channel element index of the physical downlink control channel indicating the physical downlink shared channel and transmitting the reception confirmation response on a timing identical to a timing of the user equipment.

3. The method of claim 1, wherein the RTT configuration corresponds to one of two or more configurations different from each other.

4. The method of claim 1, wherein the RTT configuration is identical to an RTT configuration used by a user equipment communicating with an eNode B within a cell in which the user equipment is contained.

5. The method of claim 4, wherein time taken for transmitting the reception confirmation response after the physical downlink shared channel is received in the RTT configuration is different from time taken for the user equipment communicating with the eNode B to transmit the reception confirmation response after the physical downlink shared channel is received.

6. The method of claim 1, wherein the RTT configuration is different from an RTT configuration used by a user equipment communicating with an eNode B within a cell in which the user equipment is contained.

7. The method of claim 1, wherein time taken for transmitting the reception confirmation response after the physical downlink shared channel is received in the RTT configuration is configured for each user equipment.

8. The method of claim 1, wherein the RTT configuration is determined in consideration of a distance from the user equipment performing the device-to-device communication.

9. The method of claim 1, wherein the RTT configuration is determined in consideration of capability information of the user equipment performing the device-to-device communication.

10. A user equipment device performing a device-to-device communication in a wireless communication system, comprising:
a transmission module;
a reception module; and
a processor that:
controls the reception module to receive a physical downlink shared channel,
controls the transmission module to transmit a reception confirmation response for the physical downlink shared channel on a resource of a physical uplink control channel,
wherein the reception confirmation response is transmitted according to an RTT (round trip time) configuration and wherein the RTT configuration is configured according to a user equipment,
wherein the resource of the physical uplink control channel is determined based on the following formula $n_{PUCCH}^{(1,\tilde{p}=p_0)}=n_{CCE} \cdot N_{conf\_RTT}+N_{PUCCH}^{(1)}+n_{RTT\_index}$,
wherein $n_{PUCCH}^{(1,\tilde{p}=p_0)}$ corresponds to the resource of the physical uplink control channel in an antenna port p0,
wherein $n_{CCE}$ corresponds to a lowest control channel element index of a physical downlink control channel indicating the physical downlink shared channel,
wherein $N_{conf\_RTT}$ corresponds to the number of the RTT configuration, wherein $N_{PUCCH}^{(1)}$ corresponds to a value delivered via upper layer signaling, and wherein $n_{RTT\_index}$ corresponds to the RTT configuration index set to the user equipment.

11. A method of transmitting a reception confirmation response, which is transmitted by a user equipment performing a device-to-device communication in a wireless communication system, comprising the steps of:
receiving a physical downlink shared channel; and
transmitting a reception confirmation response for the physical downlink shared channel on a resource of a physical uplink control channel,
wherein the reception confirmation response is transmitted according to an RTT (round trip time) configuration and wherein the RTT configuration is configured for each user equipment,
wherein the resource of the physical uplink control channel is determined based on the following formula $n_{PUCCH}^{(1,\tilde{p}=p_0)}=n_{CCE}+N_{PUCCH}^{(1)}+n_{DL\_grant}$,
wherein $n_{PUCCH}^{(1,\tilde{p}=p_0)}$ corresponds to the resource of the physical uplink control channel in an antenna port p0,
wherein $n_{CCE}$ corresponds to a lowest control channel element index of a physical downlink control channel indicating the physical downlink shared channel,
wherein $N_{PUCCH}^{(1)}$ corresponds to a value delivered via upper layer signaling, and
wherein $n_{DL\_grant}$ corresponds to a field value related to a resource region of the physical downlink shared channel.

12. The method of claim 11, wherein a resource of a physical downlink control channel is determined in consideration of a user equipment comprising an index identical to a lowest control channel element index of the physical downlink control channel indicating the physical downlink shared channel and transmitting the reception confirmation response on a timing identical to a timing of the user equipment.

13. The method of claim 11, wherein the RTT configuration corresponds to one of two or more configurations different from each other.

14. The method of claim 11, wherein the RTT configuration is identical to an RTT configuration used by a user equipment communicating with an eNode B within a cell in which the user equipment is contained.

15. The method of claim 14, wherein time taken for transmitting the reception confirmation response after the physical downlink shared channel is received in the RTT configuration is different from time taken for the user equipment communicating with the eNode B to transmit the reception confirmation response after the physical downlink shared channel is received.

16. The method of claim 11, wherein the RTT configuration is different from an RTT configuration used by a user equipment communicating with an eNode B within a cell in which the user equipment is contained.

17. The method of claim 11, wherein time taken for transmitting the reception confirmation response after the physical downlink shared channel is received in the RTT configuration is configured for each user equipment.

18. The method of claim 11, wherein the RTT configuration is determined in consideration of a distance from the user equipment performing the device-to-device communication.

19. The method of claim 11, wherein the RTT configuration is determined in consideration of capability information of the user equipment performing the device-to-device communication.

* * * * *